No. 717,908. PATENTED JAN. 6, 1903.
G. Q. PALMER.
WEEDING IMPLEMENT.
APPLICATION FILED MAY 9, 1902.
NO MODEL.
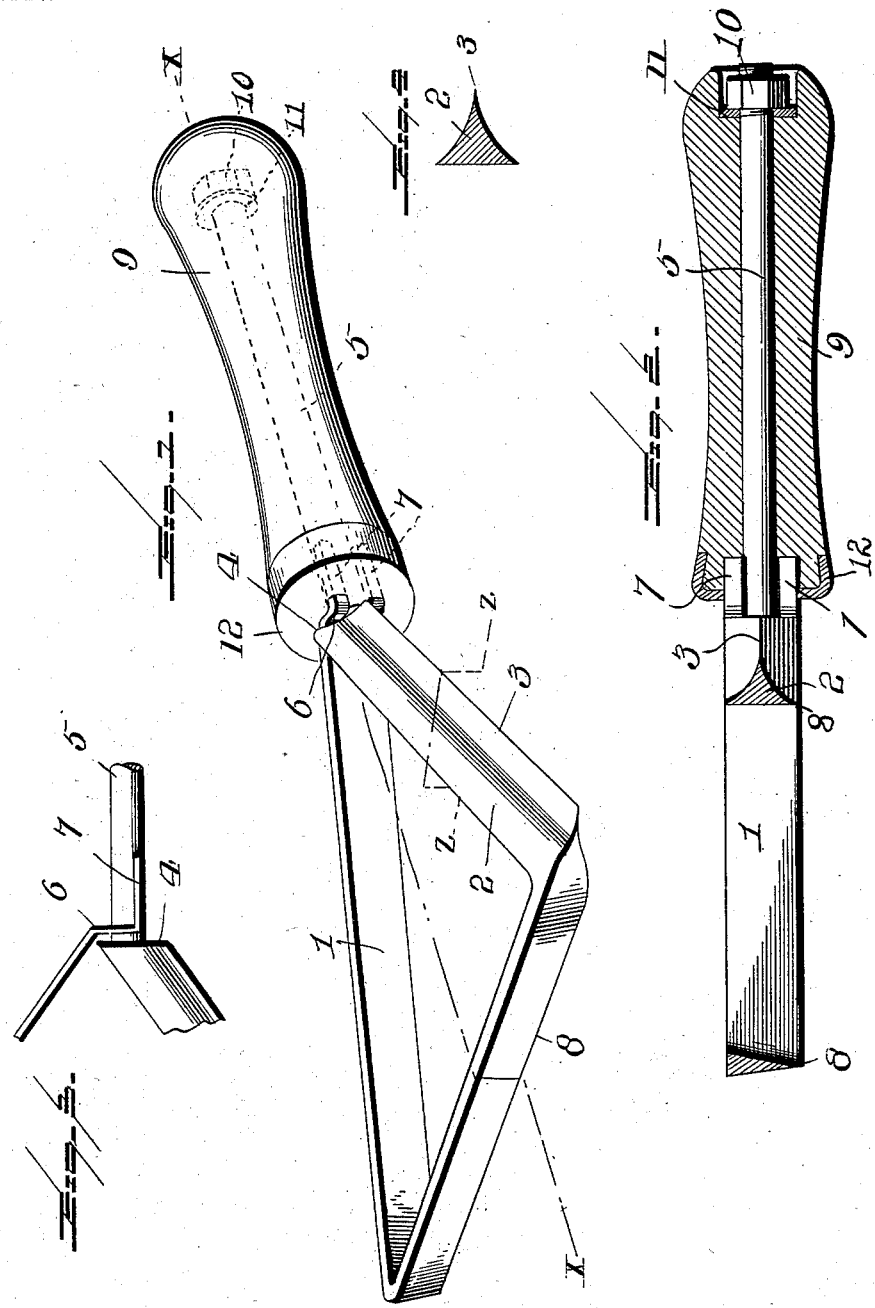

UNITED STATES PATENT OFFICE.

GEORGE Q. PALMER, OF FREDERIC, MICHIGAN.

WEEDING IMPLEMENT.

SPECIFICATION forming part of Letters Patent No. 717,908, dated January 6, 1903.

Application filed May 9, 1902. Serial No. 106,533. (No model.)

*To all whom it may concern:*

Be it known that I, GEORGE Q. PALMER, a citizen of the United States of America, residing at Frederic, in the county of Crawford and State of Michigan, have invented certain new and useful Improvements in Weeding Implements, of which the following is a specification, reference being had therein to the accompanying drawings.

My invention relates to certain new and useful improvements in weeding implements, and has for its object a device of this character which shall not only be adapted for the removal of undergrowth and weeds, but also may be used for the purpose of cutting grass, roots of trees, and be generally adapted for gardening purposes. Further, I propose to secure the blade in a manner such as shall prevent the same from becoming loose and which may be readily tightened by means to be hereinafter fully described.

Economical construction and simplicity in operation further enter into the objects of my invention.

With the above and other objects in view my invention further consists in the novel details of construction and combination of parts, to be fully described in the following specification and then pointed out in the claims.

Referring to the accompanying drawings, in which like characters of reference indicate similar parts throughout the several views, Figure 1 is a perspective view of my invention. Fig. 2 is a central sectional view on line $x\ x$, Fig. 1. Fig. 3 is a detail view of the inner ends of the blade, partly broken away; and Fig. 4 is a cross-sectional view of the thickened or cutting side or edge of the blade, taken on line $z\ z$, Fig. 1.

I preferably construct the blade 1 in the form of a triangle and form the same from a single piece of metal. One of the sides of the blade is thickened, as designated at 2, and it is beveled to a cutting edge, as at 3. The inner end of this blade is squared, as at 4, and merges into a contracted shank 5, preferably circular in cross-section, though it may be squared, hexagonal, or other shape, as may be found most desirable and convenient. The other end of the blade is flattened and offset, as at 6, and is continued at right angles to the offset portion, as at 7, the offset portion and the part 7 being bifurcated to enable the ready straddling of the shank 5, carried by the other end of the blade.

It will be noted that, as shown in Fig. 2 of the drawings, the several sides of the blades are beveled to a cutting edge in a vertical plane, as at 8, while the cutting edge of the blade 2 is beveled in a transverse or horizontal plane. The advantage of this is obvious, since in cutting grass or weeds the cutting edge of the side 2 of the blade will be found most convenient, while in digging up roots or weeding undergrowth the cutting edges 8 will be found to be most convenient.

It might be here stated that the shank of the blade extends the entire length of the handle 9 and is threaded at its outer end to receive the tightening-nut 10, the latter being received within a recess in the end of the handle and bearing against a washer 11, seated in the recess. The offset portion 6, it will be noted, seats directly against the ferrule 12, carried by the forward end of the handle, and is in turn engaged by the squared end of the blade 2, the latter carrying the shank 5. It will thus be readily noted that by tightening the nut 10 the shank of the blade will be drawn inwardly and exert pressure upon the offset portion 4, the latter being prevented from having any lateral movement by reason of its forked or bifurcated end being embedded or received within the handle 9. A tool or implement of this construction is simple, cheap, and most convenient for gardening purposes and combines a sickle and weeding-tool at no appreciable expense over the cost of one or the other separately, and its uses are unlimited, as will be readily appreciated.

My disclosure is the most practicable construction, and in the manufacture I preferably follow the lines indicated above, though I do not wish to be limited or restricted to the exact construction as shown and described, as it obvious that changes may be resorted to without departing from the general spirit of the invention.

Having thus fully described my invention, what I claim as new, and desire to secure by Letters Patent, is—

1. In an implement of the character described, a blade formed into a substantially triangular shape, with the sides thereof beveled to a cutting edge in a vertical plane, and a thickened side on said blade beveled to a cutting edge in a horizontal plane, and a handle secured to the said blade, substantially as described.

2. In an implement of the character described, the combination with a handle, of a blade of a substantially triangular shape, having one or more of its sides beveled in a vertical plane, and its other side thickened and beveled in a horizontal plane, one end of the blade carrying a shank extending into the handle, the other end of the blade being forked and extending into the handle, and means on the shank for securing the same in the handle, substantially as described.

3. A weeding implement comprising a substantially triangular blade having two of its legs or sides beveled in a vertical plane, the other leg or side of said blade being thickened and beveled in a horizontal plane on two of its faces, and a handle connected to said blade, substantially as described.

In testimony whereof I affix my signature in the presence of two witnesses.

GEORGE Q. PALMER.

Witnesses:
GEORGE W. McCULLOUGH,
J. T. CUMMINGS.